United States Patent
Saito

(10) Patent No.: US 10,629,930 B2
(45) Date of Patent: Apr. 21, 2020

(54) FUEL CELL SYSTEM AND CONTROL METHOD THEREFOR

(71) Applicant: TOYOTA JIDOSHA KABUSHIKI KAISHA, Toyota-shi, Aichi-ken (JP)

(72) Inventor: Hiromu Saito, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 74 days.

(21) Appl. No.: 15/862,134

(22) Filed: Jan. 4, 2018

(65) Prior Publication Data

US 2018/0269499 A1 Sep. 20, 2018

(30) Foreign Application Priority Data

Mar. 15, 2017 (JP) .................. 2017-049598

(51) Int. Cl.
| | |
|---|---|
| *H01M 8/04* | (2016.01) |
| *H01M 8/0438* | (2016.01) |
| *H01M 8/04746* | (2016.01) |
| *H01M 8/04089* | (2016.01) |
| *H01M 8/04955* | (2016.01) |
| *H01M 8/04223* | (2016.01) |
| *H01M 8/04664* | (2016.01) |
| *H01M 8/04082* | (2016.01) |
| *H01M 8/04828* | (2016.01) |

(52) U.S. Cl.
CPC ..... *H01M 8/0438* (2013.01); *H01M 8/04089* (2013.01); *H01M 8/04097* (2013.01); *H01M 8/04104* (2013.01); *H01M 8/04201* (2013.01); *H01M 8/04231* (2013.01); *H01M 8/04388* (2013.01); *H01M 8/04686* (2013.01); *H01M 8/04753* (2013.01); *H01M 8/04955* (2013.01); *H01M 8/0494* (2013.01)

(58) Field of Classification Search
CPC .......... H01M 8/0438; H01M 8/04753; H01M 8/04686; H01M 8/04388; H01M 8/04231; H01M 8/04097; H01M 8/04955; H01M 8/04089; H01M 8/04104; H01M 8/04201; H01M 8/0494
See application file for complete search history.

(56) References Cited

FOREIGN PATENT DOCUMENTS

| | | |
|---|---|---|
| JP | 2008-71734 | 3/2008 |
| JP | 2010-3527 | 1/2010 |
| JP | 2010-21127 | 1/2010 |

*Primary Examiner* — Cynthia K Walls
(74) *Attorney, Agent, or Firm* — Finnegan, Henderson, Farabow, Garrett & Dunner, LLP

(57) ABSTRACT

A controller closes a cutoff valve and a purge valve when a pressure value detected by a pressure sensor is an abnormal value. The controller then judges that an on-off valve has failed when the pressure value detected by the pressure sensor P1 has lowered, whereas the controller judges that the pressure sensor has failed when the pressure value detected by the pressure sensor has not lowered.

17 Claims, 3 Drawing Sheets

FUEL CELL SYSTEM AND CONTROL METHOD THEREFOR

CROSS-REFERENCES TO RELATED APPLICATIONS

This application relates to and claims priority from Japanese Patent Application No. JP2017-49598, filed on Mar. 15, 2017, the entire disclosure of which is incorporated herein by reference.

BACKGROUND

Field

The present invention relates to a fuel cell system.

Description of Related Art

JP2010-021127 A discloses a fuel cell system in which high-pressure hydrogen from a hydrogen tank is subjected to a pressure reduction using a pressure regulating valve and then supplied to a fuel cell. The supply pressure of the hydrogen supplied to the fuel cell is detected by a hydrogen pressure sensor arranged downstream from the pressure regulating valve. The hydrogen pressure sensor is driven by receiving a voltage from a constant-voltage regulator. In such fuel cell system, the output of the fuel cell is stopped when the constant-voltage regulator fails.

In another known fuel cell system, the supply pressure of hydrogen supplied to a fuel cell is regulated by an on-off valve (an injector) (see JP2008-071734 A). Such supply pressure of hydrogen is also detected by a pressure sensor arranged downstream from the on-off valve.

When a certain failure occurs, the above-mentioned pressure sensors are likely to detect a pressure value which is much higher than the supply pressure of the hydrogen supplied to the fuel cell. However, in the conventional configurations, whether such pressure increase results from a failure occurring in the pressure sensor or from other factors (e.g., an abnormal supply of hydrogen gas) has not been taken into consideration and room for improvement therefore still remains.

SUMMARY

An object of the present invention is to provide a fuel cell system that is suitable for determining, when a pressure sensor downstream from an on-off valve detects an abnormal pressure value, a cause of the abnormal value, and performing appropriate failsafe, as well as a control method for such fuel cell system.

One embodiment provides a fuel cell system comprising: a fuel cell; an on-off valve configured to be capable of reducing a pressure of a fuel gas, the on-off valve regulating a quantity of state of the fuel gas to be supplied to the fuel cell; a fuel gas supply passage having a first passage extending between the fuel cell and the on-off valve and a second passage extending from the on-off valve via a cutoff valve to a fuel gas supply source; a first pressure sensor which detects a pressure of the fuel gas inside the first passage; a gas discharge mechanism which discharges the fuel gas inside the first passage out of the first passage when the pressure of the fuel gas inside the first passage exceeds a threshold value; a circulation passage which returns a fuel-off gas discharged from the fuel cell to the first passage; a purge valve for discharging a fluid inside the circulation passage out of the circulation passage; and a controller connected to the on-off valve, the cutoff valve, the first pressure sensor and the purge valve. The controller closes the cutoff valve and the purge valve when a pressure value detected by the first pressure sensor is an abnormal value; and the controller then judges that the on-off valve has failed when the pressure value detected by the first pressure sensor has lowered, whereas the controller judges that the first pressure sensor has failed when the pressure value detected by the first pressure sensor has not lowered.

One embodiment provides a control method for a fuel cell system. The fuel cell system includes a fuel cell; an on-off valve configured so as to be capable of reducing a pressure of a fuel gas, the on-off valve regulating a quantity of state of the fuel gas to be supplied to the fuel cell; a fuel gas supply passage having a first passage, extending between the fuel cell and the on-off valve, and a second passage, extending from the on-off valve via a cutoff valve to a fuel gas supply source; a first pressure sensor which detects a pressure of the fuel gas inside the first passage; a gas discharge mechanism which discharges the fuel gas inside the first passage out of the first passage when the pressure of the fuel gas inside the first passage exceeds a threshold value; a circulation passage which returns a fuel-off gas discharged from the fuel cell to the first passage; a purge valve for discharging a fluid inside the circulation passage out of the circulation passage; and a controller connected to the on-off valve, the cutoff valve, the first pressure sensor and the purge valve. The method includes: judging, by the controller, that a first pressure value detected by the first pressure sensor is an abnormal value; closing, by the controller, the cutoff valve and the purge valve; and judging, by the controller, that the on-off valve has failed when a second pressure value detected by the first pressure sensor is smaller than the first pressure value, whereas judging, by the controller, that the first pressure sensor has failed when the second pressure value is not smaller than the first pressure value.

According to such embodiments, when the pressure value detected by the first pressure sensor downstream from the on-off valve is an abnormal value, the cutoff valve is closed. As a result, the supply of the fuel gas from the fuel gas supply source to the fuel cell is stopped. The purge valve is also closed. As a result, a closed space is defined downstream from the cutoff valve. Specifically, when the on-off valve has not encountered a failure to close (in which the on-off valve becomes unable to close), a closed space is defined by the first passage, the fuel cell and the circulation passage. When the on-off valve has encountered a failure to close, a closed space is defined by: a passage between the cutoff valve and the on-off valve in the second passage; in addition to the first passage, the fuel cell and the circulation passage. When the on-off valve has encountered a failure to close, although the pressure inside the first passage is increased, the fuel gas inside the first passage is discharged out of the first passage by the gas discharge mechanism, and the pressure inside the closed space including the first passage is therefore reduced as a whole. When the pressure inside the first passage is reduced so as to be equal to a threshold value of the gas discharge mechanism, the discharge of the fuel gas by the gas discharge mechanism is stopped, and the pressure value of the fuel gas detected by the first pressure sensor has lowered. In such case, the controller judges that the on-off valve has failed. On the other hand, when the on-off valve has not encountered a failure to close, the gas discharge mechanism does not discharge the fuel gas and the pressure inside the closed space is not reduced. Accordingly, the pressure value of the fuel gas detected by the first pressure sensor has not lowered. In such case, the controller judges that the first pressure sensor has failed. As described above, since a determination is made as to which of the on-off valve or the first pressure sensor has failed when the above-mentioned abnormal condition occurs, it is possible to perform failsafe control suitable for the failed part.

The controller may stop power generation of the fuel cell after closing the cutoff valve and before judging whether or not the pressure value detected by the first pressure sensor has lowered.

With such an aspect, the power generation of the fuel cell is stopped while the judgment as to which of the on-off valve or the first pressure sensor has failed is being made. This causes fluctuations in the pressure of the fuel gas within the closed space to be suppressed when the on-off valve has not encountered the failure to close, and it is therefore possible to improve the degree of accuracy of the failure judgment for the first pressure sensor.

The controller may maintain a stopped state of the power generation of the fuel cell when judging that the on-off valve has failed, whereas the controller may open the cutoff valve and restart the power generation of the fuel cell when judging that the first pressure sensor has failed.

With such an aspect, since the operation of the fuel cell is changed in accordance with the result of the judgment which is made when the above-mentioned abnormal condition occurs, appropriate failsafe control can be performed. In particular, it is possible to prevent the stopped state of the power generation of the fuel cell from being maintained in the situation where the first pressure sensor has failed.

The fuel cell system may further comprise a second pressure sensor which detects a pressure of the fuel gas inside the second passage, wherein: the controller causes, after closing the cutoff valve, the second pressure sensor to monitor pressure reduction in the second passage; and as a result of the monitoring, if pressure reduction in the second passage is observed, the controller judges whether or not the pressure value detected by the first pressure sensor has lowered, whereas, if pressure reduction in the second passage is not observed, the controller judges that the first pressure sensor has failed.

With such an aspect, when the first pressure sensor has failed in a configuration where a mechanical pressure regulating valve is provided in the second passage, the failure in the first pressure sensor can be determined by using the second pressure sensor at an earlier stage.

The controller may open the purge valve after observing the pressure reduction in the second passage and before judging whether or not the pressure value detected by the first pressure sensor has lowered.

With such an aspect, when the on-off valve has encountered a failure to close, the pressure inside the first passage, which has been reduced by the gas discharge mechanism so as to be equal to the threshold value of the gas discharge mechanism, can be further reduced by opening the purge valve. As a result, since the pressure inside the closed space including the fuel gas passage in the fuel cell is reduced, the fuel cell can be protected from being subjected to high pressure during the failure judgment.

The fuel cell system may further comprise a pressure regulating valve between the on-off valve and the cutoff valve, the pressure regulating valve reducing a pressure of the fuel gas, wherein: the second passage has a third passage extending from the on-off valve to the pressure regulating valve and a fourth passage extending from the pressure regulating valve via the cutoff valve to the fuel gas supply source; and the second pressure sensor monitors pressure reduction in at least one of the third and fourth passages.

In some embodiments, the fuel cell system may further comprise: a pressure regulating valve between the on-off valve and the cutoff valve, the pressure regulating valve reducing a pressure of the fuel gas; a third pressure sensor which detects a pressure of the fuel gas inside a passage between the on-off valve and the pressure regulating valve; and a fourth pressure sensor which detects a pressure of the fuel gas inside a passage between the pressure regulating valve and the cutoff valve, wherein: the controller causes, after closing the cutoff valve, the third pressure sensor and the fourth pressure sensor to monitor pressure reduction, and as a result of the monitoring, if pressure reduction is observed by the third pressure sensor and the fourth pressure sensor, the controller judges whether or not the pressure value detected by the first pressure sensor has lowered, whereas, if pressure reduction is not observed by at least one of the third and forth pressure sensors, the controller judges that the first pressure sensor has failed.

With such an aspect, when the first pressure sensor has failed in a configuration using a mechanical valve as the pressure regulating valve, the failure in the first pressure sensor can be determined by using the third pressure sensor and the fourth pressure sensor at an earlier stage.

In such case, the controller may open the purge valve after the pressure reduction is observed by the third pressure sensor and the fourth pressure sensor and before judging whether or not the pressure value detected by the first pressure sensor has lowered.

With such an aspect, the fuel cell can be protected from being subjected to high pressure during the failure judgment, similarly to the above-mentioned case.

In some embodiments, the controller may limit an output of the fuel cell after closing the cutoff valve and before judging whether or not the pressure value detected by the first pressure sensor has lowered.

With such an aspect, since the fuel cell generates electric power while its output is limited, the fuel gas inside the closed space is consumed. As a result, when the on-off valve has encountered a failure to close, pressure reduction in the closed space due to consumption of the fuel gas occurs in addition to the pressure reduction in the closed space due to the gas discharge mechanism. Accordingly, when the on-off valve has encountered a failure to close, the failure can be determined at an earlier stage.

In such case, the fuel cell system may further comprise a second pressure sensor which detects a pressure of the fuel gas inside the second passage, wherein: the controller determines, after closing the cutoff valve, an output limit value of the fuel cell based on a pressure value detected by the second pressure sensor; and the controller limits the output of the fuel cell based on the determined output limit value.

With such an aspect, the amount of the fuel gas remaining in the second passage between the cutoff valve and the on-off valve can be obtained from the pressure value detected by the second pressure sensor. Accordingly, the power generation of the fuel cell can be maintained with an output limit value based on the remaining amount of the fuel gas.

The fuel cell system may further comprise: a pressure regulating valve between the on-off valve and the cutoff valve, the pressure regulating valve reducing a pressure of the fuel gas; a third pressure sensor which detects a pressure of the fuel gas inside a passage between the on-off valve and the pressure regulating valve; and a fourth pressure sensor which detects a pressure of the fuel gas inside a passage between the pressure regulating valve and the cutoff valve, wherein: the controller stops the power generation of the fuel cell after pressure values detected by the third pressure sensor and the fourth pressure sensor become equal to each other, after limiting the output of the fuel cell; and the controller then maintains a stopped state of the power generation of the fuel cell when judging that the on-off valve has failed, whereas the controller restarts the power generation of the fuel cell by opening the cutoff valve when judging that the first pressure sensor has failed.

With such an aspect, since the power generation of the fuel cell is stopped after the pressure values detected by the third pressure sensor and the fourth pressure sensor become equal, the accuracy of failure judgment of the first pressure sensor can be increased when the on-off valve has not encountered a failure to close. In addition, since the operation of the fuel cell is changed based on the judgment result, appropriate failsafe control can be performed.

The controller may open the purge valve after stopping the power generation of the fuel cell and before judging whether or not the pressure value detected by the first pressure sensor has lowered.

With such an aspect, the fuel cell can be protected from being subjected to high pressure during the failure judgment, similarly to the above-mentioned case.

The controller may cause, after closing the cutoff valve, the fuel cell to perform normal power generation; and the controller may start limiting the output of the fuel cell after a pressure value detected by the fourth pressure sensor has lowered below a threshold value.

With such an aspect, when the on-off valve has encountered a failure to close, pressure reduction in the closed space due to the normal power generation of the fuel cell can be further promoted in the initial stage of such failure to close. Accordingly, when the on-off valve has encountered a failure to close, the failure can be determined at an earlier stage of the failure to close.

In some of the above-mentioned aspects of the fuel cell system, the on-off valve may be an injector. The gas discharge mechanism may be a pressure relief valve connected to the first passage. The controller may close the cutoff valve before closing the purge valve when the pressure value detected by the first pressure sensor is an abnormal value.

In some of the above-mentioned aspects of the fuel cell system, the controller may judge that the pressure value is an abnormal value when the pressure value detected by the first pressure sensor exceeds a threshold value.

With such an aspect, it is possible to easily judge the occurrence of an abnormal pressure value detected by the first pressure sensor.

DETAILED DESCRIPTION

Preferred embodiments of the present invention will be described below with reference to the attached drawings.

Figure 1:
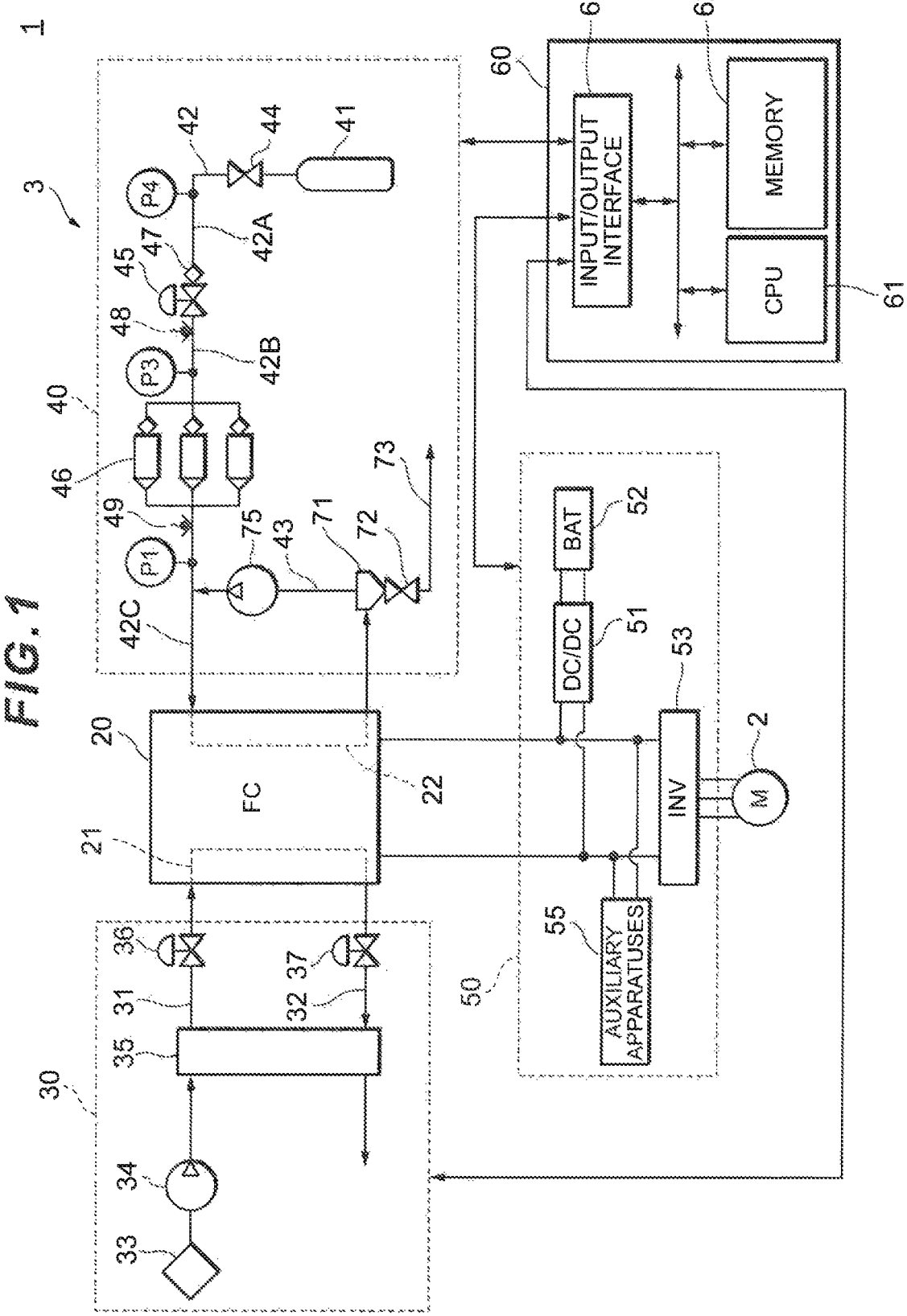
FIG. 1 is a block diagram showing a configuration of a fuel cell system according to an embodiment.

As shown in FIG. 1, a fuel cell vehicle 1 includes a traction motor 2 and a fuel cell system 3. The traction motor 2 may be, for example, a three-phase AC motor functioning as a power source for the fuel cell vehicle 1. The fuel cell system 3 may include a fuel cell 20 which generates electric power through electrochemical reaction between hydrogen gas and oxidant gas, an oxidant gas supply system 30 which supplies air as the oxidant gas to a cathode electrode of the fuel cell 20, a fuel gas supply system 40 which supplies hydrogen as the fuel gas to an anode electrode of the fuel cell 20, a power system 50 which controls charge and discharge of electric power, and a controller 60 which collectively controls the entire system. The fuel cell 20 may be a solid polyelectrolyte-type fuel cell stack formed by stacking a plurality of cells, for example, in series, and the fuel cell 20 functions as an in-vehicle power supply. The fuel cell 20 has, inside thereof, an oxidant gas passage 21 through which the oxidant gas is supplied and a fuel gas passage 22 through which the fuel gas is supplied.

The oxidant gas supply system 30 has an oxidant gas supply passage 31 through which oxidant gas to be supplied to the fuel cell 20 flows, and an oxidant off-gas passage 32 through which oxidant off-gas to be discharged from the fuel cell 20 flows. The oxidant gas supply passage 31 is provided with an air compressor 34 that introduces oxidant gas from the atmosphere via a filter 33, a humidifier 35 that humidifies the oxidant gas, and a throttle valve 36 that regulates the amount of the oxidant gas to be supplied. The oxidant off-gas passage 32 is provided with a back pressure regulating valve 37 for regulating the supply pressure of the oxidant gas. The humidifier 35 humidifies the oxidant gas by moisture exchange between the oxidant gas (dry gas) and the oxidant off-gas (wet gas). The humidifier 35 may be omitted.

The fuel gas supply system 40 has a fuel gas supply source 41, a fuel gas supply passage 42 through which fuel gas to be supplied from the fuel gas supply source 41 to the fuel cell 20 flows, and a circulation passage 43 for allowing a fuel off-gas discharged from the fuel cell 20 to return to the fuel gas supply passage 42. The fuel gas supply source 41 stores hydrogen at a high pressure (e.g., 35 MPa to 70 MPa). The fuel gas supply source 41 is constituted by, for example, a hydrogen tank, a hydrogen absorbing alloy, or the like. The fuel gas supply source 41 may alternatively include a reformer that generates a hydrogen-rich reformed gas from a hydrocarbon-based fuel, and a high-pressure gas tank that accumulates the reformed gas which has been generated in the reformer after bringing it into a high-pressure state.

The fuel gas supply passage 42 is provided with a cutoff valve 44, a pressure regulating valve 45 and an injector 46. The cutoff valve 44 allows or stops the supply of the fuel gas from the fuel gas supply source 41 through the fuel gas supply passage 42 to the fuel cell 20. The cutoff valve 44 functions as a main valve for the fuel gas supply source 41. The pressure regulating valve 45 is a pressure reducing valve that reduces a pressure at the upstream side of the pressure regulating valve 45 (primary pressure) to a preset secondary pressure. Although the pressure regulating valve 45 may employ any mechanical, electrical and electromagnetic configuration, a mechanical valve is employed in the present embodiment. For example, the mechanical pressure regulating valve 45 has a known configuration having a housing in which a back pressure chamber and a pressure regulating chamber are formed with a diaphragm partitioning such chambers, wherein the primary pressure is reduced to a predetermined secondary pressure within the pressure regulating chamber by using a back pressure in the back pressure chamber. The pressure regulating valve 45 is assembled with a filter 47 arranged upstream therefrom and a pressure relief valve 48 arranged downstream therefrom. The pressure relief valve 48 is normally closed and mechanically actuated when the pressure of a pipe between the pressure regulating valve 45 and the injector 46 exceeds a predetermined level (threshold value) so as to discharge the fuel gas out of the fuel gas supply passage 42.

The injector 46 is an on-off valve which is configured to be capable of reducing the pressure of the fuel gas and regulating the quantity of state of the fuel gas to be supplied to the fuel cell 20. The gas quantity state of the fuel gas may refer to a flow rate, pressure, temperature, molar concentration, etc. In this embodiment, the injector 46 is configured to be capable of regulating a supply pressure and a supply rate of the fuel gas to be supplied to the fuel cell 20 with a high degree of accuracy. The injector 46 may be of, for example, an electromagnetically-driven type. The injector 46 includes: a valve seat having an injection hole for injecting the fuel gas; and a valve body that is driven by a solenoid so as to open and close the injection hole. The injector 46 performs the above-mentioned regulation by, for example, driving the valve body apart from the valve seat at predetermined driving intervals using an electromagnetic driving force. More than one such injector 46 may be provided in the fuel gas supply passage 42 and, in this embodiment, three injectors are provided in parallel. Each injector 46 is provided with a filter on the upstream side therefrom and a pressure relief valve 49 on the downstream side therefrom. The pressure relief valve 49 is normally closed and mechanically actuated when the pressure of a pipe between the injector 46 and the fuel cell 20 exceeds a predetermined level (threshold value) so as to discharge the fuel gas out of the fuel gas supply passage 42.

The pressure of the fuel gas supplied from the fuel gas supply source 41 to the fuel cell 20 is reduced by the pressure regulating valve 45 and the injector 46. For example, the pressure of the fuel gas sent out from the fuel gas supply source 41, which is 35 MPa-70 MPa, is reduced to about 1.5 MPa by the pressure regulating valve 45 and further reduced to about 200 kPa by the injector 46. In terms of the magnitude of the pressure of the fuel gas in each step of such two-step pressure reduction, the fuel gas supply passage 42 can be divided into the following passages: a high-pressure passage 42A extending from the fuel gas supply source 41 via the cutoff valve 44 to the pressure regulating valve 45; a middle-pressure passage 42B extending from the pressure regulating valve 45 to the injector 46; and a low-pressure passage 42C extending from the injector 46 to the fuel cell 20. The high-pressure passage 42A, the middle-pressure passage 42B and the low-pressure passage 42C are provided with a high-pressure pressure sensor P4, a middle-pressure pressure sensor P3, and a low-pressure pressure sensor P1, respectively, for detecting the pressure of the fuel gas within the respective passages. The cutoff valve 44, the injector 46, and the pressure sensors P4, P3 and P1 are connected to the controller 60. It should be noted that the pressure detected by the high-pressure pressure sensor P4 while the cutoff valve 44 is opened reflects the pressure of the fuel gas within the fuel gas supply source 41.

The low-pressure passage 42C corresponds to a "first passage" in the claims to be set forth later. In the same way, the middle-pressure passage 42B corresponds to a "third passage" arranged downstream from a "second passage," the high-pressure passage 42A corresponds to a "fourth passage" arranged upstream from the "second passage," the low-pressure pressure sensor P1 corresponds to a "first pressure sensor," the middle-pressure pressure sensor P3 corresponds to a "second pressure sensor" or a "third pressure sensor," and the high-pressure pressure sensor P4 corresponds to the "second pressure sensor" or a "fourth pressure sensor." The pressure relief valve 49 connected to the low-pressure passage 42C corresponds to a "gas discharge mechanism" for discharging the fuel gas inside the low-pressure passage 42C out of the low-pressure passage 42C when the pressure of the fuel gas inside the low-pressure passage 42C exceeds the threshold value.

The circulation passage 43 returns the fuel off-gas discharged from the fuel cell 20 to the low-pressure passage 42C. The circulation passage 43 is connected to an exhaust/drain passage 73 via a gas-liquid separator 71 and an exhaust/drain valve 72. The gas-liquid separator 71 collects water from the fuel off-gas. The exhaust/drain valve 72 is a purge valve for discharging a fluid which is inside the circulation passage 43 out of the circulation passage 43. For example, the exhaust/drain valve 72 is appropriately opened by a command from the controller 60 during power generation of the fuel cell 20 so as to discharge (i.e., purge) the water collected by the gas-liquid separator 71 and the fuel off-gas containing impurities inside the circulation passage 43 to the exhaust/drain passage 73. The circulation passage 43 is provided with a pump 75 for compressing the fuel off-gas inside the circulation passage 43 and then delivering the compressed fuel off-gas to the low-pressure passage 42C. The low-pressure pressure sensor P1 is provided on the injector side with respect to the merging point between the circulation passage 43 and the low-pressure passage 42C. It should be noted that the fuel off-gas discharged through the exhaust/drain valve 72 and the exhaust/drain passage 73 is diluted by, for example, a diluter (not shown) and then merges with the oxidant-off gas inside the oxidant off-gas passage 32.

The power system 50 includes a DC/DC converter 51, a secondary battery 52, a traction inverter 53, and auxiliary apparatuses 55. The DC/DC converter 51 has: a function of increasing a direct-current voltage supplied from the secondary battery 52 and outputting the resulting voltage to the traction inverter 53; and a function of decreasing the voltage of direct-current power generated by the fuel cell 20 or the voltage of regenerative power collected by the traction motor 2 as a result of regenerative braking, in order to charge the secondary battery 52 with the resulting power. The charge and discharge of the secondary battery 52 are controlled with the aid of these functions of the DC/DC converter 51. In addition, the voltage conversion control by the DC/DC converter 51 controls an operating point of the fuel cell 20 (an output voltage, an output current). The secondary battery 52 functions as: a storage source for excess electric power; a storage source for regenerative energy during regenerative braking; or an energy buffer provided for a load change resulting from acceleration or deceleration of the fuel cell vehicle 1. Suitable examples of the secondary battery 52 may include a secondary battery, such as a nickel-cadmium battery, a nickel-hydrogen battery and a lithium secondary battery. The traction inverter 53 may be, for example, a PWM inverter driven by pulse width modulation, and the traction inverter 53 converts a direct-current voltage output from the fuel cell 20 or the secondary battery 52 to a three-phase alternating current voltage in accordance with a control command from the controller 60 and controls a rotation torque of the traction motor 2. The auxiliary apparatuses 55 collectively refer to various types of motors provided in respective parts of the fuel cell vehicle 1 (e.g., power sources for the pumps), inverters for driving such motors, and various types of in-vehicle auxiliary apparatuses (e.g., air compressor, injector, cooling-water circulation pump, radiator, etc.).

The controller 60 is an electronic control unit which includes a CPU 61, a memory 62, and an input/output interface 63, and the controller 60 may be, for example, constituted as a microcomputer. The CPU 61 performs a desired operation in accordance with a control program and performs various types of processing and control. The memory 62 has, for example, ROM and RAM. The ROM stores control programs and control data processed by the CPU 61 and the RAM is used as various types of work areas, mainly for control processing. The input/output interface 63 is connected to devices constituting parts of the fuel cell vehicle 1, such as the air compressor 34, the pressure sensors P1, P3 and P4, the cutoff valve 44, the injector 46, the DC/DC converter 51, the traction inverter 53, the exhaust/drain valve 72, and the pump 75. With such configuration, the controller 60, upon receiving an input signal from various types of sensors, such as the pressure sensors P1, P3 and P4, sends a command signal to various types of loads to thereby control the entire system of the fuel cell vehicle 1. For example, the controller 60 controls the DC/DC converter 51 so as to regulate the output voltage of the fuel cell 20 to thereby control the operating point (an output voltage, an output current) of the fuel cell 20.

If a failure to close of the injector 46 (a phenomenon in which the valve body of the injector 46 becomes unable to completely close the injection hole of the valve seat due to, for example, clogging of foreign matters, a short circuit in a power supply, etc.) occurs during the operation of the fuel cell system 3, the fuel gas flows toward the downstream side without its pressure being reduced by the injector 46, which causes the pressure on the downstream side of the injector 46 to increase. As a result, the pressure sensor P1 detects an abnormal upper limit (a value higher than the range of pressures detected by the pressure sensor P1 during a normal condition I). On the other hand, if a failure of the pressure sensor P1 (e.g., drift) occurs, the pressure sensor P1 may also detect an abnormal upper limit. Accordingly, when the pressure sensor P1 detects the abnormal upper limit, it is impossible to tell which of the pressure sensor P1 or the injector 46 has failed based only on the detected value. In view of such circumstances, the controller 60 of the present embodiment is configured to perform a predetermined control flow when the above-mentioned abnormal upper limit is detected, to thereby determine which of the pressure sensor P1 or the injector 46 has failed.

Figure 2:
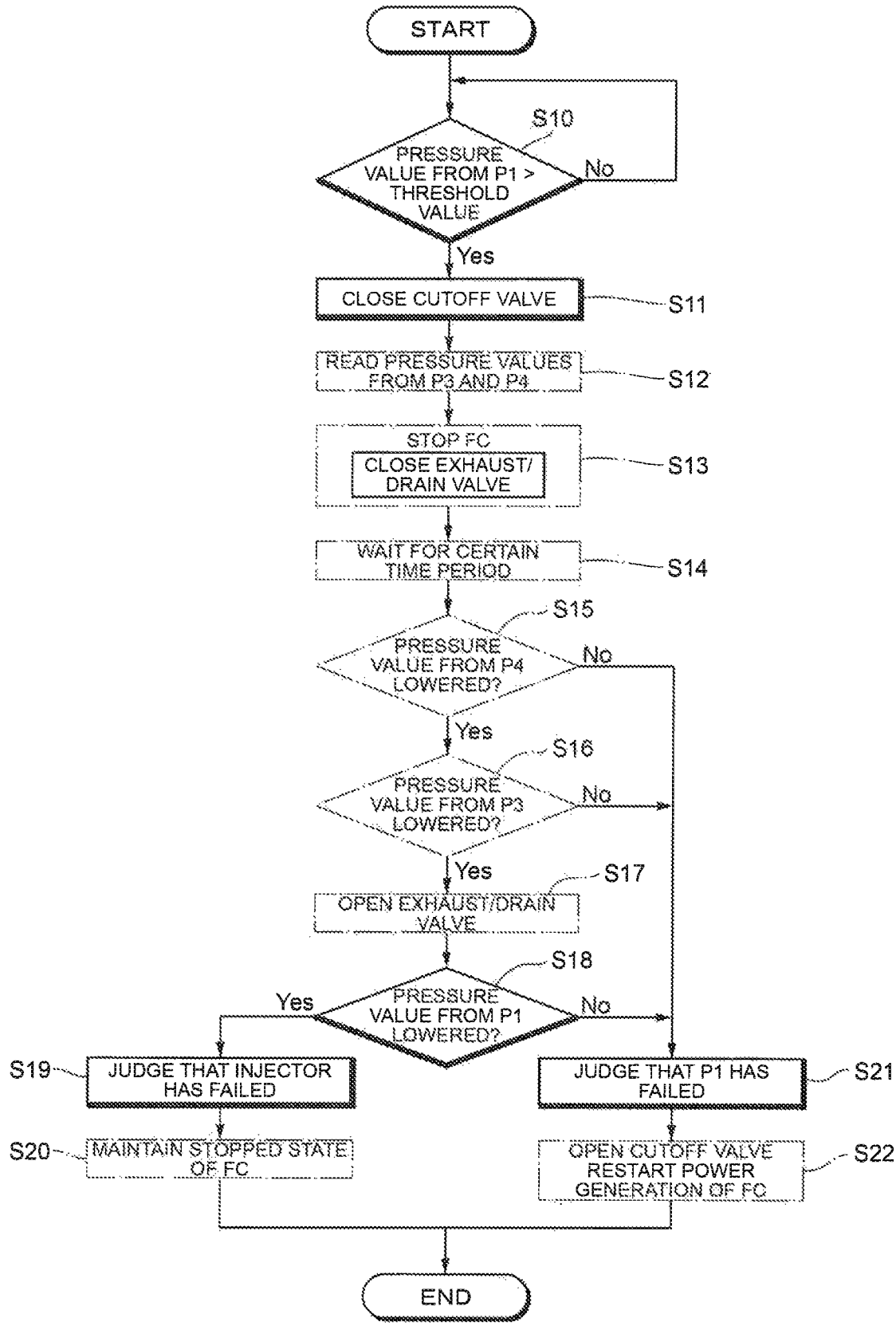
FIG. 2 is a flowchart showing a first control method for the fuel cell system of FIG. 1.

The following description will describe a control flow performed when the pressure sensor P1 detects an abnormal value with reference to FIG. 2. Each processing in the control flow is performed by the controller 60.

During a normal operation of the fuel cell system 3, the pressure of the fuel gas supplied from the fuel gas supply source 41 to the fuel cell 20 is monitored by the pressure sensors P4, P3 and P1. During this time, the pressure sensor P4 detects a pressure inside the fuel gas supply source 41 (e.g., 35 MPa-70 MPa), the pressure sensor P3 detects a pressure which has been reduced by the pressure regulating valve 45 to, for example, about 1.5 MPa, and the pressure sensor P1 detects a pressure which has been reduced by the injector 46 to, for example, about 200 kPa. In this context, the pressure sensors P4, P3 and P1 are defined as being in a normal condition as long as they indicate pressure values within, for example, the following ranges:

Pressure sensor P4: 1-70 MPa;
Pressure sensor P3: 1.2-1.6 MPa; and
Pressure sensor P1: 0-300 kPa Under such conditions, predetermined pressures at which the pressure relief valves 48, 49 are mechanically activated (relief pressures) are set to the following values:

Pressure relief valve 48: 2 MPa; and
Pressure relief valve 49: 350 kPa

The controller 60 judges, based on a pressure value detected by the pressure sensor P1 (step S10), whether or not an abnormal pressure has occurred in the low-pressure passage 42C. More specifically, if the pressure value detected by the pressure sensor P1 exceeds a threshold value, the controller 60 judges that this pressure value is an abnormal value (step S10: Yes). Here, the threshold value is set to equal to or higher than an upper limit (300 kPa) of the range of values detected by the pressure sensor P1 in a normal condition. However, the threshold value is set lower than a lower limit (1.2 MPa) of the range of the normally detected value of the pressure sensor P3. The threshold value may alternatively be set to the relief pressure of the pressure relief valve 49 or higher. When the controller 60 judges that an abnormal pressure has occurred in the low-pressure passage 42C, the controller 60 closes the cutoff valve 44 (step S11). As a result, the supply of the fuel gas from the fuel gas supply source 41 to the fuel gas supply passage 42 is stopped. The control apparatus 60 may cause an alarm lamp of the fuel cell vehicle 1 to light up, along with closing of the cutoff valve 44.

Next, the controller 60 obtains pressure values detected by the pressure sensors P3 and P4 (step S12). The controller 60 calculates the amount of the fuel gas remaining in the pipes based on the obtained pressure values. Specifically, the controller 60 calculates the amount of the fuel gas remaining in the high-pressure passage 42A between the cutoff valve 44 and the pressure regulating valve 45 based on the pressure value detected by the pressure sensor P4 and calculates the amount of the fuel gas remaining in the middle-pressure passage 42B based on the pressure value detected by the pressure sensor P3. By performing such calculations, it is possible to obtain the total amount of the fuel gas remaining in the pipes upstream from the injector 46.

The controller 60 then stops the power generation of the fuel cell 20 and closes the exhaust/drain valve 72 (step S13). Specifically, the operation mode of the fuel cell 20 is switched to an intermittent operation and the discharge of fluid from the exhaust/drain valve 72 is stopped. As a result, when the injector 46 has not encountered a failure to close, a closed space is defined by the low-pressure passage 42C, the fuel gas passage 22, and the circulation passage 43. On the other hand, when the injector 46 has encountered a failure to close, a closed space is defined by a passage between the cutoff valve 44 and the pressure regulating valve 45 in the high-pressure passage 42A, and the middle-pressure passage 42B, in addition to the above-mentioned low-pressure passage 42C, the fuel gas passage 22, and the circulation passage 43.

The controller 60 then waits until a certain time period has elapsed while causing the pressure sensors P1, P3 and P4 to monitor their relevant pressures (step S14). During such waiting period, if the injector 46 has not encountered a failure to close, the fuel gas is not discharged from the pressure relief valve 49 and the pressure inside the above-mentioned closed space is therefore not reduced. Accordingly, the pressure values detected by the pressure sensors P4 and P3 during and after the waiting period should not change from the pressure values detected in step S12. In view of the above, in situations where, after a certain time period has elapsed (step S14), the pressure value detected by the pressure sensor P4 has not lowered (step S15: No) or the pressure value detected by the pressure sensor P3 has not lowered (step S16: No), the controller 60 judges that the pressure sensor P1 has failed (in an abnormal condition) (step S21). In this way, by defining the closed space and using the pressure sensor P4 and pressure sensor P3, when the pressure sensor P1 has failed, such failure can be determined at an earlier stage.

On the other hand, during the waiting period (step S14), if the injector 46 has encountered a failure to close, the pressure inside the low-pressure passage 42C is first increased. When such increased pressure exceeds the relief pressure of the pressure relief valve 49, the fuel gas is discharged from the pressure relief valve 49. As a result of such fuel gas discharge, the pressure inside the high-pressure passage 42A is first reduced. The reason for this is that the fuel gas remaining in the high-pressure passage 42A between the cutoff valve 44 and the pressure regulating valve 45 is caused to flow through the mechanical pressure regulating valve 45 to the middle-pressure passage 42B. Then, when the pressure inside the high-pressure passage 42A is reduced so as to be about equal to the pressure inside the middle-pressure passage 42B, the pressure inside the high-pressure passage 42A and the pressure inside the middle-pressure passage 42B are reduced in conjunction with each other and finally reduced so as to be equal to the relief pressure (350 kPa) of the pressure relief valve 49, whereby the pressure inside the closed space including the high-pressure passage 42A, the middle-pressure passage 42B, and the low-pressure passage 42C become uniform. That is to say, if the injector 46 has encountered a failure to close, the pressure values detected by the pressure sensors P4 and P3 after the waiting period should be lowered from the pressure values detected in step S12. In view of the above, when observing that both the pressure values detected by the pressure sensors P4 and P3 are lowered (step S15: Yes and Step S16: Yes) after a certain time period has elapsed (step S14), the controller 60 judges whether or not the pressure value detected by the pressure sensor P1 has lowered (step S18).

The "certain time period" for waiting in step S14 may be set to a predetermined time period based on experiments or simulations. For example, time taken for the fuel gas to be discharged from the pressure relief valve 49 in a case where a failure to close occurs in the injector 46 is obtained in advance and the obtained time may be set as the "predetermined time period." The "predetermined time period" may be increased or decreased in accordance with the calculated amount of the fuel gas remaining in the pipes.

Before proceeding to step S18, the controller 60 opens the exhaust/drain valve 72 (step S17). As a result, the fluid (the fuel gas, fuel-off gas and water) inside the circulation passage 43 is discharged to the exhaust/drain passage 73 and the pressure inside the closed space including the fuel gas passage 22 is therefore reduced. Consequently, when the injector 46 has encountered a failure to close, the pressure inside the fuel gas passage 22 can be reduced to below the relief pressure of the pressure relief valve 49, and it is therefore possible to protect the fuel cell 20 from being subjected to high pressure. It should be noted that, by opening the exhaust/drain valve 72, it is also possible to reduce the pressure inside the closed space to below the upper limit of the range of the values detected by the pressure sensor P1 in a normal condition.

Next, the controller 60 judges whether or not the pressure value detected by the pressure sensor P1 has lowered (step S18). In this context, the state wherein the pressure value detected by the pressure sensor P1 has lowered indicates that the pressure value (a second pressure value) from the pressure sensor P1 after closing the cutoff valve 44 becomes smaller than the pressure value from the pressure sensor P1 before closing the cutoff valve 44 (i.e., the pressure value exceeding the threshold value in step S10; a first pressure value).

When the pressure value detected by the pressure sensor P1 has lowered (step S18: Yes), the controller 60 judges that the injector 46 has failed (in an abnormal condition) (step S19). In this case, the controller 60 continues to stop the power generation of the fuel cell 20 (step S20). At this time, the controller 60 may prompt an occupant of the fuel cell vehicle 1 to check and/or replace the injector 46 by displaying, for example, an alarm light.

On the other hand, when the pressure value detected by the pressure sensor P1 has not lowered (step S18: No), the controller 60 judges that the pressure sensor P1 has failed (in an abnormal condition) (step S21). In this case, the controller 60 opens the cutoff valve 44 to restart the power generation of the fuel cell 20 (step S22). At this time, the controller 60 may prompt an occupant of the fuel cell vehicle 1 to check and/or replace the pressure sensor P1 by, for example, displaying an alarm light. Due to the restart of the power generation, the controller 60 performs control for various types of devices, wherein such control is unrelated to the pressure value detected by the pressure sensor P1, such as opening the exhaust/drain valve 72 as appropriate.

In the fuel cell system 3 according to the embodiment described above, when judging that an abnormal pressure value has been detected by the pressure sensor P1, the controller 60 closes the cutoff valve 44 and the exhaust/drain valve 72 to thereby define a predetermined closed space in the fuel gas supply system 40. Then, when the pressure value detected by the pressure sensor P1 has lowered, the controller 60 judges that the injector 46 has failed, whereas, when the pressure value detected by the pressure sensor P1 has not lowered, the controller 60 judges that the pressure sensor P1 has failed. Since the controller 60 determines which of the pressure sensor P1 or the injector 46 has failed when the pressure sensor P1 detects an abnormal pressure value, it is possible to perform failsafe control suitable for the failed part.

The controller 60 stops the power generation of the fuel cell 20 after closing the cutoff valve 44 (step S11) and before judging whether or not the pressure value detected by the pressure sensor P1 has lowered (step S18) (step S13). This causes fluctuations in the pressure of the fuel gas within the closed space to be suppressed when the pressure sensor P1 has failed, and it is therefore possible to improve the degree of accuracy of the failure judgment of the pressure sensor P1 (step S18: No).

In addition, after determining which of the pressure sensor P1 or the injector 46 has failed, the controller 60 changes the operation of the fuel cell 20 based on the determination result. Specifically, when judging that the injector 46 has failed, the controller 60 maintains the stopped state of the power generation of the fuel cell 20 (steps S19 and S20). On the other hand, when judging that the pressure sensor P1 has failed due to drift, etc., the injector 46 normally regulates the quantity of state of the fuel gas and therefore the fuel cell system 3 is in a state where it can normally supply the fuel gas to the fuel cell 20. Thus, when judging that the pressure sensor P1 has failed, the controller 60 opens the cutoff valve 44 to restart the power generation of the fuel cell 20 (steps S21 and S22).

With such configuration, the fuel cell vehicle 1 can continue to travel and can therefore travel to a maintenance factory on its own.

Figure 3:
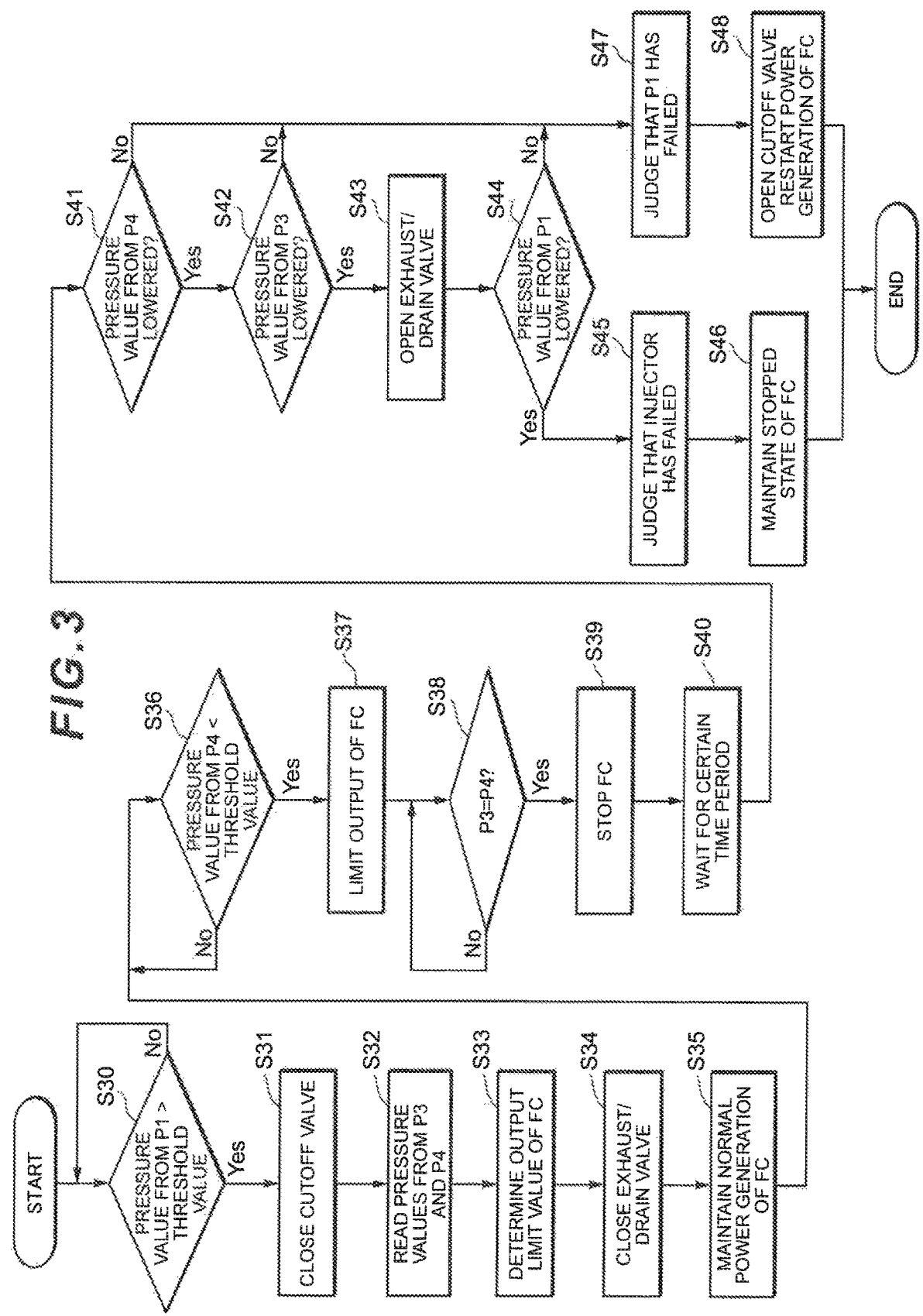
FIG. 3 is a flowchart showing a second control method for the fuel cell system of FIG. 1.

The following description will describe another control flow performed when the pressure sensor P1 detects an abnormal value with reference to FIG. 3. It should be noted that the following description will omit the features in common with those of the control flow of FIG. 2 and only describe differences therefrom.

Steps S30 to S32 are the same as steps S10 to S12 in FIG. 2. In step S32, the controller 60 calculates the total amount of the fuel gas remaining in the pipes upstream from the injector 46 based on the pressure values detected by the pressure sensors P3 and P4, and determines an output limit value of the fuel cell 20 based on the calculated amount (step S33). The controller 60 then closes the exhaust/drain valve 72 (step S34) while maintaining the normal power generation of the fuel cell 20 (step S35). During such normal power generation, the fuel gas inside the above-mentioned closed space is consumed by the fuel cell 20. Due to such normal power generation, the pressure inside the high-pressure passage 42A starts to be reduced. If the injector 46 has encountered a failure to close, the fuel gas is also discharge from the pressure relief valve 49, and the pressure inside the high-pressure passage 42A is further reduced.

During normal power generation, the pressure sensors P4 and P3 monitor the relevant pressures so that the fuel cell 20 will not become short of the fuel gas. When the pressure value detected by the pressure sensor P4 has lowered below the threshold value (step 36: Yes), the controller 60 limits the output of the fuel cell 20 (step S37). The threshold value should only be required to be set to larger than the upper limit of the range of values detected by the pressure sensor P3 in a normal condition and may be set to, for example, 5 MPa. The output limit of the fuel cell 20 is performed by the controller 60 controlling the DC/DC converter 51 based on the output limit value determined in step S33. After that, when the pressure inside the high-pressure passage 42A becomes equal to the pressure inside the middle-pressure passage 42B (step S38: Yes), the controller 60 stops the power generation of the fuel cell 20 (step S39).

The subsequent steps S40 to S48 are the same as steps S14 to S22 of FIG. 2. For example, the controller 60 waits until a certain time period has elapsed while causing the pressure sensors P4, P3 and P1 to monitor their relevant pressures (step S40). During such waiting period, if the injector 46 has not encountered a failure to close, the fuel gas is not discharged from the pressure relief valve 49 and the pressure inside the closed space including the high-pressure passage 42A and the middle-pressure passage 42B should therefore not be reduced after step S38. In view of the above, in situations where the pressure values detected by the pressure sensors P4 and P3 in step 38 are not changed after a certain time period has elapsed (step S41: No, step S42: No), the controller 60 judges that the pressure sensor P1 has failed (in an abnormal condition) (step S47). On the other hand, during the waiting period (step S40), if the injector 46 has encountered a failure to close, the pressure inside the high-pressure passage 42A and the pressure inside the middle-pressure passage 42B are reduced in conjunction with each other as a result of the discharge of the fuel gas from the pressure relief valve 49 and finally reduced so as to be equal to the pressure inside the low-pressure passage 42C. In view of the above, when observing that both the pressure values detected by the pressure sensors P4 and P3 are lowered (step S41: Yes, step S42: Yes) after a certain time period has elapsed (step S40), the controller 60 judges whether or not the pressure value detected by the pressure sensor P1 has lowered (step S44).

The fuel cell system 3 which performs the above-described control flow of FIG. 3 determines which of the pressure sensor P1 or the injector 46 has failed when the pressure sensor P1 detects an abnormal pressure value, in the same way as in the control flow of FIG. 2, and it is therefore possible to perform failsafe control suitable for the failed part.

In particular, the controller causes the fuel cell 20 to normally generate electric power for a while (step S35) after closing the cutoff valve 44 (step S31) and before making a judgment as to whether or not the pressure value detected by the pressure sensor P1 has lowered (step S44), and then limits the output of the fuel cell (step S37). As a result, when the injector 46 has encountered a failure to close, pressure reduction inside the closed space due to the consumption of the fuel gas occurs, in addition to the pressure reduction inside the closed space caused by the pressure relief valve 49. Accordingly, the determination that the injector 46 has encountered a failure to close can be made at an earlier stage. In addition, when it is judged that the pressure sensor P1 has failed, the power generation of the fuel cell 20 can be restarted more promptly.

The embodiment described above is provided in order to aid in the easy understanding of the present invention and is not intended to limit the interpretation of the present invention. The elements included in the embodiment, as well as the arrangements, materials, conditions, shapes and sizes thereof, are not limited to those illustrated in the embodiment and may be changed as appropriate. For example, the pressure regulating valve 45 may be omitted. Alternatively, another pressure reducing device (e.g., an injector) may be provided in place of the pressure regulating valve 45. Alternatively, one or more steps (S12, a part of S13, S14 to S17, S20 and S22) shown in the broken line frames in FIG. 2 may be omitted as appropriate.

What is claimed is:
1. A fuel cell system, comprising:
a fuel cell;
an on-off valve configured to selectively reduce a pressure of a fuel gas, the on-off valve regulating a quantity of state of the fuel gas to be supplied to the fuel cell;
a fuel gas supply passage having a first passage extending between the fuel cell and the on-off valve and a second passage extending from the on-off valve via a cutoff valve to a fuel gas supply source;
a first pressure sensor that detects a pressure of the fuel gas inside the first passage;
a gas discharge mechanism that discharges the fuel gas inside the first passage out of the first passage when the pressure of the fuel gas inside the first passage exceeds a threshold value;
a circulation passage that returns a fuel-off gas discharged from the fuel cell to the first passage;
a purge valve for discharging a fluid inside the circulation passage out of the circulation passage; and
a controller connected to the on-off valve, the cutoff valve, the first pressure sensor and the purge valve,
the controller being programmed to:
close the cutoff valve and the purge valve when a pressure value detected by the first pressure sensor is an abnormal value, and
after closing the cutoff valve and the purge valve:

determine that the on-off valve has failed when the pressure value detected by the first pressure sensor has lowered, and determine that the first pressure sensor has failed when the pressure value detected by the first pressure sensor has not lowered.

2. The fuel cell system according to claim 1, wherein the controller is further programmed to stop power generation of the fuel cell after closing the cutoff valve and before determining whether or not the pressure value detected by the first pressure sensor has lowered.

3. The fuel cell system according to claim 2, wherein the controller is further programmed to maintain a stopped state of the power generation of the fuel cell after determining that the on-off valve has failed, and open the cutoff valve and restart the power generation of the fuel cell after determining that the first pressure sensor has failed.

4. The fuel cell system according to claim 2, further comprising a second pressure sensor that detects a pressure of the fuel gas inside the second passage, wherein:
the controller is further programmed to:
cause the second pressure sensor to monitor pressure reduction in the second passage after closing the cutoff valve;
determine whether or not a pressure value detected by the first pressure sensor has lowered if pressure reduction in the second passage is observed; and
if pressure reduction in the second passage is not observed, determine that the first pressure sensor has failed.

5. The fuel cell system according to claim 4, wherein the controller is further programmed to open the purge valve after the second pressure sensor monitors a pressure reduction in the second passage and before determining whether or not the pressure value detected by the first pressure sensor has lowered.

6. The fuel cell system according to claim 4, further comprising a pressure regulating valve between the on-off valve and the cutoff valve, the pressure regulating valve being configured to selectively reduce a pressure of the fuel gas, wherein:
the second passage has a third passage extending from the on-off valve to the pressure regulating valve and a fourth passage extending from the pressure regulating valve via the cutoff valve to the fuel gas supply source; and
the second pressure sensor monitors pressure reduction in at least one of the third and fourth passages.

7. The fuel cell system according to claim 2, further comprising:
a pressure regulating valve between the on-off valve and the cutoff valve, the pressure regulating valve being configured to selectively reduce a pressure of the fuel gas;
a third pressure sensor which detects a pressure of the fuel gas inside a passage between the on-off valve and the pressure regulating valve; and
a fourth pressure sensor which detects a pressure of the fuel gas inside a passage between the pressure regulating valve and the cutoff valve, wherein:
the controller is programmed to:
cause the third pressure sensor and the fourth pressure sensor to monitor pressure reduction after closing the cutoff valve,
determine whether or not the pressure value detected by the first pressure sensor has lowered if a pressure reduction is observed by the third pressure sensor and the fourth pressure sensor, and
determine that the first pressure sensor has failed if pressure reduction is not observed by at least one of the third and fourth pressure sensors.

8. The fuel cell system according to claim 7, wherein the controller is programmed to open the purge valve after a pressure reduction is observed by the third pressure sensor and the fourth pressure sensor and before determining whether or not the pressure value detected by the first pressure sensor has lowered.

9. The fuel cell system according to claim 1, wherein the controller is programmed to limit an output of the fuel cell after closing the cutoff valve and before determining whether or not the pressure value detected by the first pressure sensor has lowered.

10. The fuel cell system according to claim 9, further comprising a second pressure sensor that detects a pressure of the fuel gas inside the second passage, wherein:
the controller is programmed to:
determine an output limit value of the fuel cell based on a pressure value detected by the second pressure sensor after closing the cutoff valve; and
limit the output of the fuel cell based on the determined output limit value.

11. The fuel cell system according to claim 9, further comprising:
a pressure regulating valve between the on-off valve and the cutoff valve, the pressure regulating valve being configured to selectively reduce a pressure of the fuel gas;
a third pressure sensor which detects a pressure of the fuel gas inside a passage between the on-off valve and the pressure regulating valve; and
a fourth pressure sensor which detects a pressure of the fuel gas inside a passage between the pressure regulating valve and the cutoff valve, wherein:
the controller is programmed to:
stop the power generation of the fuel cell after pressure values detected by the third pressure sensor and the fourth pressure sensor become equal to each other, after limiting the output of the fuel cell;
maintain a stopped state of the power generation of the fuel cell after determining that the on-off valve has failed; and
restart the power generation of the fuel cell by opening the cutoff valve after determining that the first pressure sensor has failed.

12. The fuel cell system according to claim 11, wherein the controller is programmed to open the purge valve after stopping the power generation of the fuel cell and before determining whether or not the pressure value detected by the first pressure sensor has lowered.

13. The fuel cell system according to claim 11, wherein:
the controller is programmed to cause the fuel cell to perform normal power generation after closing the cutoff valve; and
the controller is programmed to start limiting the output of the fuel cell after a pressure value detected by the fourth pressure sensor has lowered below a threshold value.

14. The fuel cell system according to claim 1, wherein the on-off valve is an injector.

15. The fuel cell system according to claim 1, wherein the gas discharge mechanism is a pressure relief valve connected to the first passage.

16. The fuel cell system according to claim 1, wherein the controller is programmed to close the cutoff valve before closing the purge valve when the pressure value detected by the first pressure sensor is an abnormal value.

17. The fuel cell system according to claim 1, wherein the controller is programmed to determine that the pressure value is an abnormal value when the pressure value detected by the first pressure sensor exceeds a threshold value.

* * * * *